(12) United States Patent
Jung et al.

(10) Patent No.: US 8,605,101 B2
(45) Date of Patent: Dec. 10, 2013

(54) APPARATUS AND METHOD OF READING TEXTURE DATA FOR TEXTURE MAPPING

(75) Inventors: Seok Yoon Jung, Seoul (KR); Sang Oak Woo, Anyang-si (KR); Kwon Taek Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

(21) Appl. No.: 12/385,413

(22) Filed: Apr. 7, 2009

(65) Prior Publication Data

US 2010/0110091 A1 May 6, 2010

(30) Foreign Application Priority Data

Nov. 5, 2008 (KR) ........................ 10-2008-0109235

(51) Int. Cl.
*G06T 11/40* (2006.01)
*G09G 5/00* (2006.01)

(52) U.S. Cl.
USPC ........................................ 345/552; 345/582

(58) Field of Classification Search
USPC .......................... 345/552, 557, 582
See application file for complete search history.

(56) References Cited

U.S. PATENT DOCUMENTS 6,353,438 B1 *  3/2002  Van Hook et al. ............. 345/552
7,061,500 B1 *  6/2006  Baldwin ........................ 345/582

FOREIGN PATENT DOCUMENTS

| JP | 10-021414 | 1/1998 |
|---|---|---|
| KR | 10-0204336 | 3/1999 |
| KR | 10-2000-0039714 | 7/2000 |
| KR | 10-0285599 | 1/2001 |
| KR | 10-2006-0119085 | 11/2006 |

* cited by examiner

*Primary Examiner* — Hau Nguyen
(74) *Attorney, Agent, or Firm* — Staas & Halsey LLP

(57) ABSTRACT

An apparatus and method of reading texture data for texture mapping. Each of a plurality of blocks included in a cache memory may have any one of an even numbered index or odd numbered index. In this instance, the cache memory may be embodied with an odd numbered index cache memory including odd numbered index blocks and an even numbered index cache memory including even numbered index blocks. Also, address indexes of requested texture data may be analyzed to appropriately access to at least one of the odd numbered index cache memory and even numbered index cache memory, thereby improving an accessing speed.

14 Claims, 8 Drawing Sheets

FIG. 2

| 1 | 2 | 3 | ..... | n |
|---|---|---|---|---|
| n+1 | n+2 | n+3 | ..... | 2n |
| ⋮ | ⋮ | ⋮ | ⋱ | ⋮ |
| n(m-1)+1 | n(m-1)+2 | n(m-1)+3 | ..... | n·m |

APPARATUS AND METHOD OF READING TEXTURE DATA FOR TEXTURE MAPPING

CROSS-REFERENCE TO RELATED APPLICATIONS

This application claims the benefit of Korean Patent Application No. 10-2008-0109235, filed on Nov. 5, 2008, in the Korean Intellectual Property Office, the disclosure of which is incorporated herein by reference.

BACKGROUND

1. Field

Example embodiments relate to a technique of processing a three-dimensional (3D) graphic, and more particularly, to a cache memory storing texture data and a technique of accessing the cache memory 2. Description of the Related Art A process of rendering three-dimensional (3D) graphic data may include a texture mapping process of determining two-dimensional (2D) pixels by mapping, in a polygon of a 3D object, texture data previously stored in a memory. Texture images used in the texture mapping process may be previously stored in a main memory, and each of the texture images may include a plurality of texture data. In this instance, the texture data may be referred to as texel, that is, texture element.

Also, in order to generate a single 2D pixel, one or more texture data may be used. In particular, a relatively high data bandwidth may be required when a plurality of texture data is required to generate the single 2D pixel.

In this instance, many 3D graphic data processing apparatuses may utilize a cache memory storing frequently required texture data, thereby reducing the required data bandwidth, and improving a processing speed. However, resources may be required even in a process of reading the texture data stored in the cache memory, and a delay in the processing speed may occur. Accordingly, there is a need for improving the processing speed by more effectively using the cache memory.

SUMMARY

Example embodiments may provide an apparatus and method of reading texture data for texture mapping which may include an odd numbered index cache memory including odd numbered index blocks and an even numbered index cache memory including even numbered index blocks, thereby improving an access speed with respect to the cache memory without increasing a utilized size of the cache memory.

Example embodiments may also provide an apparatus and method of reading texture data for texture mapping which may analyze address indexes of utilized texture data, thereby effectively determining locations where the texture data is located.

According to example embodiments, there may be provided an apparatus of reading texture data for texture mapping, the apparatus including an odd numbered index cache memory to include a plurality of odd numbered index blocks having an odd numbered index; an even numbered index cache memory to include a plurality of even numbered index blocks having an even numbered index; and a controller to generate a read request with respect to requested texture data in the odd numbered index cache memory or the even numbered index cache memory based on at least two address indexes of the requested texture data.

According to example embodiments, there may be provided a method of reading texture data for texture mapping, the method including: storing texture data in each of a plurality of odd numbered index blocks included in an odd numbered cache memory, the plurality of odd numbered index blocks having an odd numbered index; storing texture data in each of a plurality of even numbered index blocks included in an even numbered index cache memory, the plurality of even numbered index blocks having an even numbered index; and generating a read request with respect to requested texture data in the odd numbered index cache memory or in the even numbered index cache memory based on address indexes corresponding to the requested texture data.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which:

FIG. 2 is a diagram illustrating an example of a texture image stored in a main memory;

FIG. 5 is a diagram illustrating an example of a cache memory including a plurality of blocks where texture data is stored;

DETAILED DESCRIPTION OF EMBODIMENTS

Figure 1:
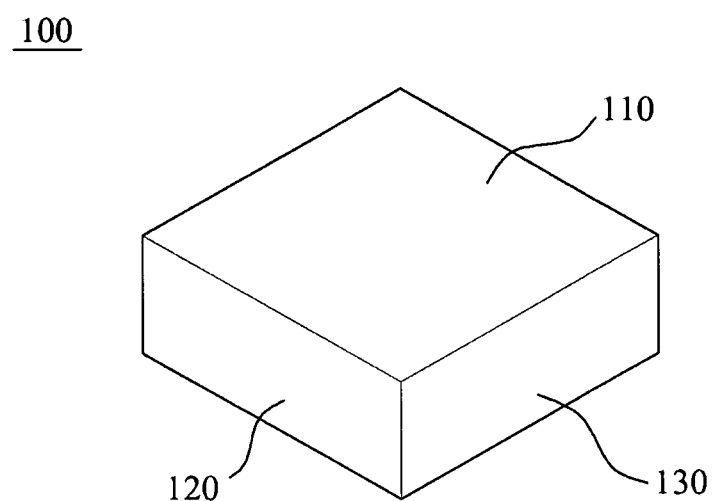
FIG. 1 is a diagram illustrating an example of a three-dimensional (3D) object to be rendered.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a diagram illustrating an example of a three-dimensional (3D) object 100 to be rendered.

The 3D object 100 may have various formats, however, it is assumed that the 3D object 100 may have three two-dimensional (2D) planes 110, 120, and 130 for convenience of description.

In each of the three 2D planes 110, 120, and 130 of the 3D object 100, at least one texture image may be mapped. More specifically, each of the at least one texture image may comprise a plurality of texture data or texture elements, that is, texels. In this instance, determining pixels included in each of 2D planes 110, 120, and 130 using a part of the plurality texture data may be referred to as texture mapping.

Also, to perform texture mapping with respect to a single pixel, at least one texture data may be used. In particular, when the at least one texture data is used for the texture mapping, specific weights may be applied to each of the texture data depending on a location of the pixel and locations of the texture data, whereby interpolated data may be generated.

Figure 2:
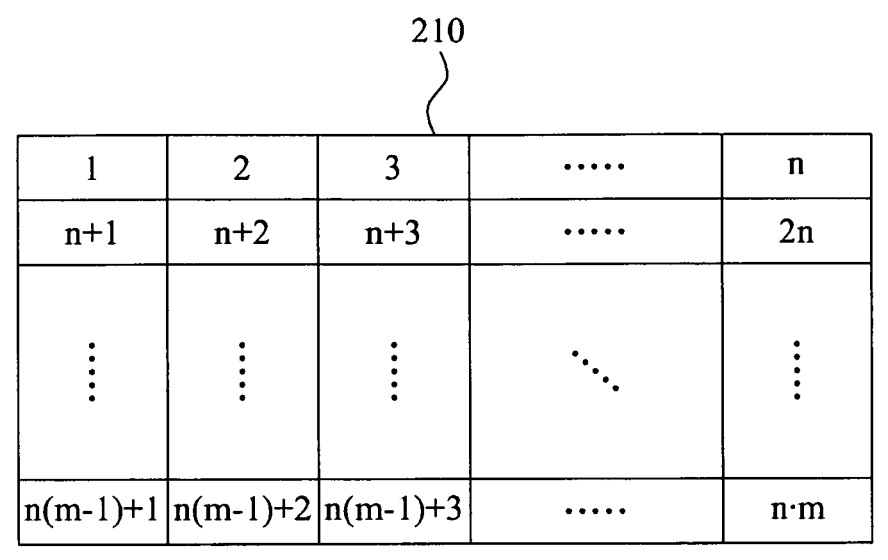

FIG. 2 is a diagram illustrating an example of a texture image stored in a main memory 210.

Referring to FIG. 2, the main memory 210 may store a plurality of texture data included in at least one texture image using n×m-numbered storage spaces. Here, 1, 2, 3, . . . , n·m within columns illustrated in FIG. 2 may designate the storage spaces and address indexes of the texture data.

Specifically, each of the plurality of texture data may be stored in each of the storage spaces of the main memory 210, and utilized texture data may be read from the storage spaces of the main memory 210 to be provided to a rendering device (not shown in FIG. 2).

However, frequently utilized texture data may be stored in a cache memory different from the main memory 210. Specifically, the cache memory may prevent identical texture data from being repeatedly read from the main memory 210, thereby increasing a processing speed.

Figure 3:
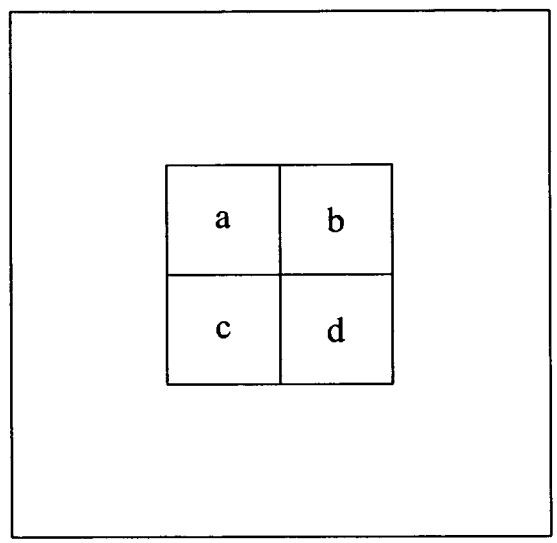
FIG. 3 is a diagram illustrating an example of access-requested texture data.

FIG. 3 is a diagram illustrating an example of access-requested texture data.

Referring to FIG. 3, to generate single interpolated data, four texture data a, b, c, and d may be used. However, unlike FIG. 3, a number of the texture data used in generating the single interpolated data may be diversely expressed such as 1, 2, 3, and 4.

Depending on a location of a pixel corresponding to the single interpolated data and locations of the texture data, a weight may be applied to each of the access-requested texture data a, b, c, and d. In this instance, the texture data may be provided from the main memory or cache memory to the rendering device.

In this instance, the apparatus and method of reading texture data according to an embodiment may provide schemes used for effectively reading the access-requested texture data from the cache memory.

Figure 4:
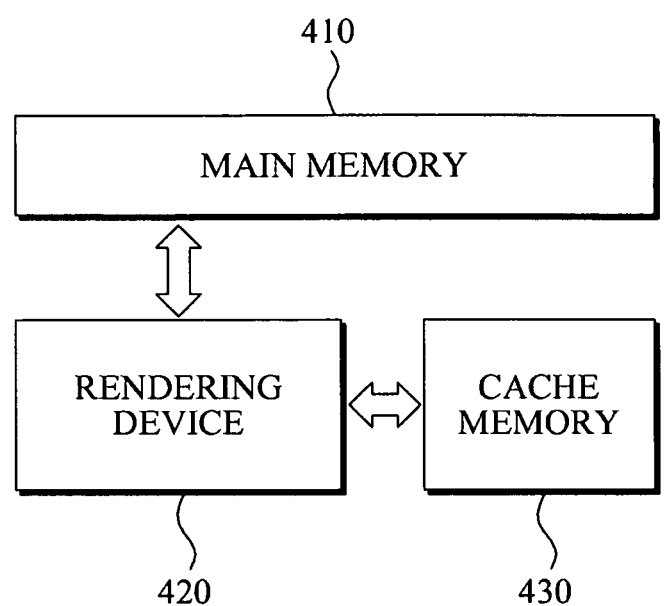
FIG. 4 is a block diagram illustrating an example of a graphic processing apparatus including a main memory, a rendering device, and a cache memory.

FIG. 4 is a block diagram illustrating an example of a graphic processing apparatus including a main memory 410, a rendering device 420, and a cache memory 430.

Referring to FIG. 4, the graphic processing apparatus may include the main memory 410, the rendering device 420, and the cache memory 430.

The main memory 410 may store texture data constituting at least one texture image. Also, the rendering device 420 may read specific texture data from the main memory 410 to perform texture mapping.

In this instance, texture data frequently utilized by the rendering device 420 may be separately stored in the cache memory 430. Accordingly, the rendering device 420 may rapidly and frequently read texture data.

Despite the above, sequentially reading the texture data from the cache memory 430 may be inefficient.

Here, as illustrated in FIG. 3, it is assumed that the four texture data a, b, c, and d may be read from the cache memory 430. In this instance, when the single cache memory 430 exists, and a time utilized in reading single texture data is T, a time utilized in sequentially reading each of the texture data a, b, c, and d may be 4T. Also, providing four cache memories having an identical size so as to simultaneously read the texture data a, b, c, and d may increase costs.

In this instance, the apparatus of reading texture data according to an embodiment may improve a speed utilized in reading the texture data a, b, c, and d while not increasing an entire size of the cache memories. This will be described in detail below.

Figure 5:
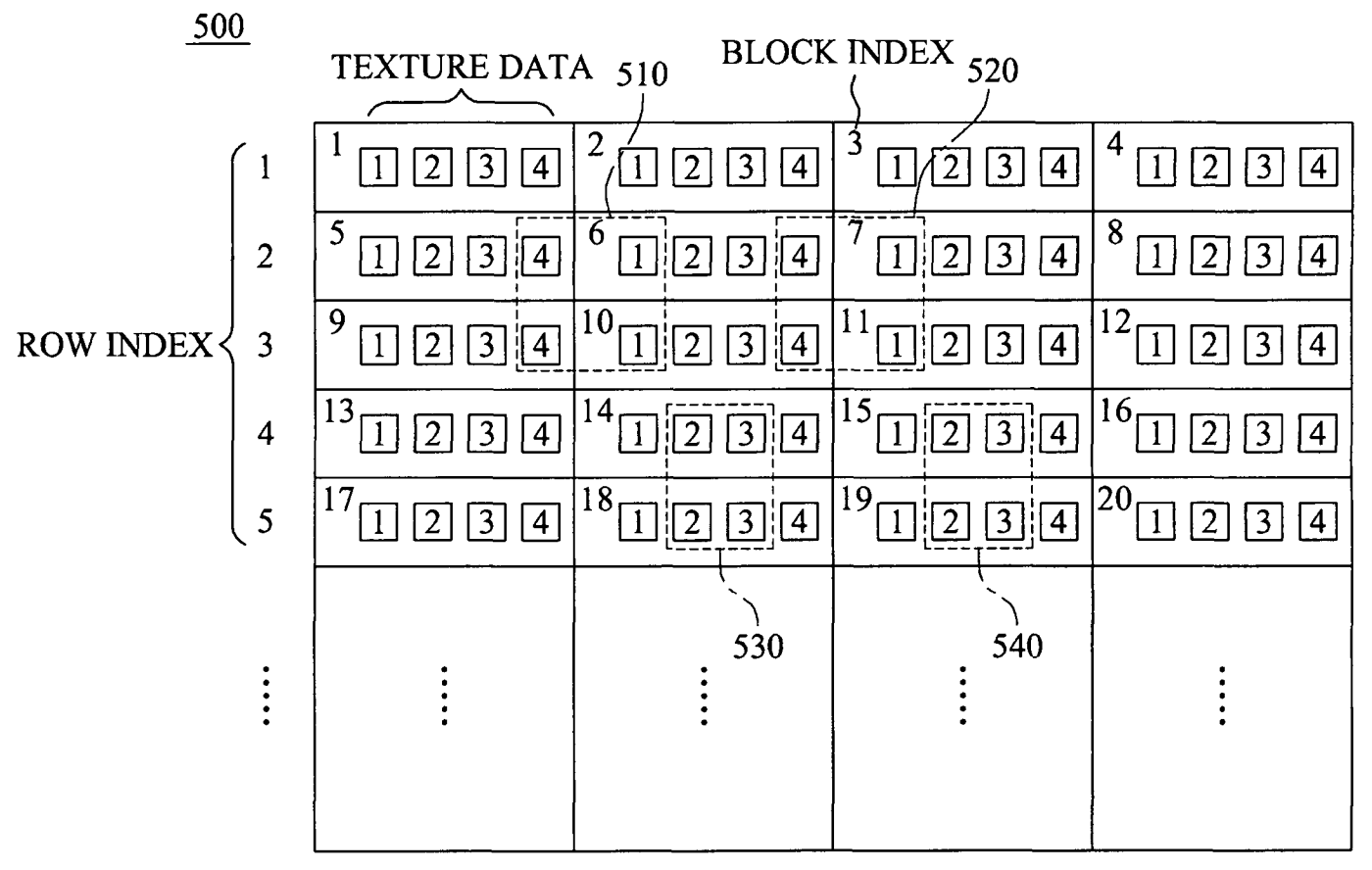

FIG. 5 is a diagram illustrating an example of a cache memory 500 including a plurality of blocks where texture data is stored.

Referring to FIG. 5, the cache memory 500 may include a plurality of storage spaces, and texture data may be stored in each of the plurality of storage spaces. A predetermined number of storage spaces of the plurality of storage spaces may be grouped into a single block according to address indexes. The single block may include four storage spaces as illustrated in FIG. 5, however, a number of the storage spaces included in the single block may be $2^k$ (k being a natural number). Here, the single block may designate a processing unit of the cache memory 500 with respect to a reading operation.

Since whether each of the storage spaces is included in a designated block may be determined based on address indexes of storage spaces included in blocks (or address indexes of texture data, block indexes may not need to be physically determined. However, for convenience of description, it is assumed that the block indexes for identifying each of blocks are determined as Arabic numerals as illustrated in FIG. 5.

Also, the block indexes of the Arabic numerals may not need to be determined with respect to the blocks, and also may not need to be distinguished into an odd number and an even number. For example, an odd numbered index and an even numbered index may be replaced with a first index and a second index different from the first index.

Also, when the cache memory 500 includes four (or even numbered) blocks in a transverse direction, odd numbered index blocks including odd numbered block indexes 1, 5, 9, 13, 17 and 3, 7, 11, 15, 19 may exist adjacent with each other in a vertical direction. Similarly, even numbered index blocks having even numbered block indexes 2, 6, 10, 14, 18 and 4, 8, 12, 16, 20 may exist adjacent with each other in a vertical direction.

Storage patterns of four requested texture data (see descriptions with reference to FIG. 3) may have four storage patterns 510, 520, 530, and 540.

First, the storage pattern 510 and two of the four requested texture data may be stored in two odd numbered index blocks 5 and 9, and the remaining two of the four requested texture data may be stored in two even numbered index blocks 6 and 10. Second, two of the four requested texture data such as the storage pattern 520 may be stored in two even numbered index blocks 6 and 10, and the remaining two of the four requested texture may be stored in two odd numbered index blocks 7 and 11. Third, all of the requested texture data such as the storage pattern 530 may be stored in two even numbered index blocks 14 and 18. Fourth, all of the requested texture data such as the storage pattern 540 may be stored in two odd numbered index blocks 15 and 19.

In this instance, the apparatus of reading texture data according to an embodiment may include an even number index cache memory including even numbered index blocks, and an odd numbered index cache memory including odd numbered index blocks. Also, the apparatus of reading texture data may ascertain a storage pattern of the requested texture data based on address indexes of the requested texture data, whereby whether the requested texture data is stored in the odd numbered index cache memory or the odd numbered index cache memory may be determined. Also, the apparatus of reading texture data may rapidly read the requested texture data from the even numbered index cache memory or the odd numbered index cache memory based on the determined result.

For example, it is assumed that four texture data stored according to the storage pattern 510 may be requested. In this instance, the apparatus of reading texture data according to an embodiment may extract an address index 9-4 of fourth texture data of a ninth block and an address index 10-1 of first texture data of a tenth block from a row of an identical row index 3, respectively. The apparatus of reading texture data may extract an address index 5-4 of fourth texture data of a fifth block and an address index 6-1 of first texture data of a sixth block from a row of an identical row index 2, respectively. Also, the apparatus of reading texture data may ascertain that two of four texture data requested based on the address index 9-4 and address index 10-1 are stored in the odd numbered index cache memory, and the remaining two are stored in the even numbered index cache memory. In this instance, the apparatus of reading texture data may perform reading request with respect to the odd numbered index cache memory and even numbered index cache memory in parallel, thereby rapidly reading the four texture data.

Figure 6:
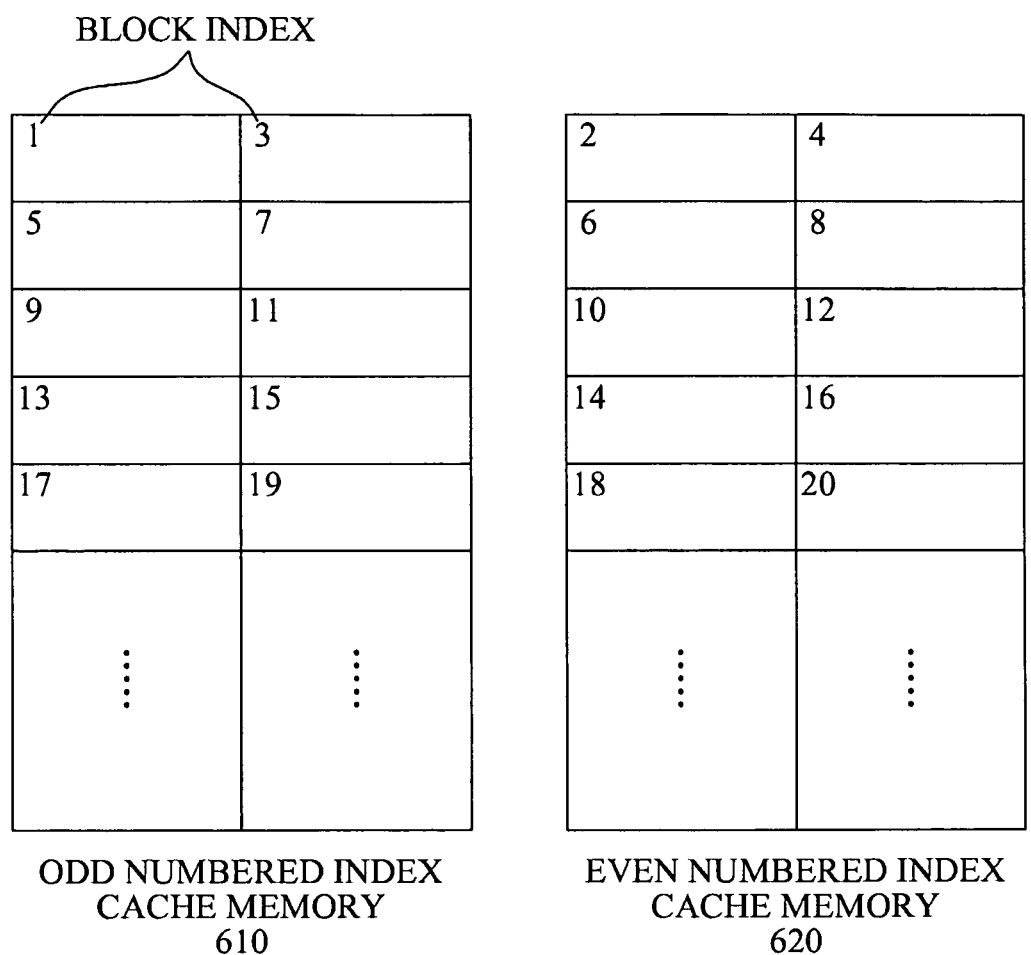
FIG. 6 is a diagram illustrating an odd numbered index cache memory and an even number index cache memory according to example embodiments.

FIG. 6 is a diagram illustrating an odd numbered index cache memory and an even number index cache memory according to example embodiments.

Referring to FIG. 6, an apparatus of reading texture data according to an embodiment may separately include an odd numbered index cache memory 610 and an even numbered index cache memory 620.

The odd number index cache memory 610 may include odd numbered index blocks having an odd numbered index, and the even numbered index cache memory 620 may include even numbered index blocks having an even numbered index. Here, each of the odd number index blocks and even number index blocks may include $2^k$ storage spaces (k being a natural number) to thereby store $2^k$ texture data.

When all of the requested texture data are determined to be stored in the odd numbered index cache memory 610, the apparatus of reading texture data may read all of the texture data requested from the odd numbered index cache memory 601. Conversely, when all of the requested texture data are determined to be stored in the even numbered index cache memory 620, the apparatus of reading texture data may read all of the texture data requested from the even numbered index cache memory 620. Also, when a part of the requested texture data is stored in the odd numbered index cache memory 610, and the remaining parts thereof are stored in the even numbered index cache memory 620, the apparatus of reading texture data may generate reading request with respect to the odd numbered index cache memory 610 and the even numbered index cache memory 620 in parallel.

Figure 7:
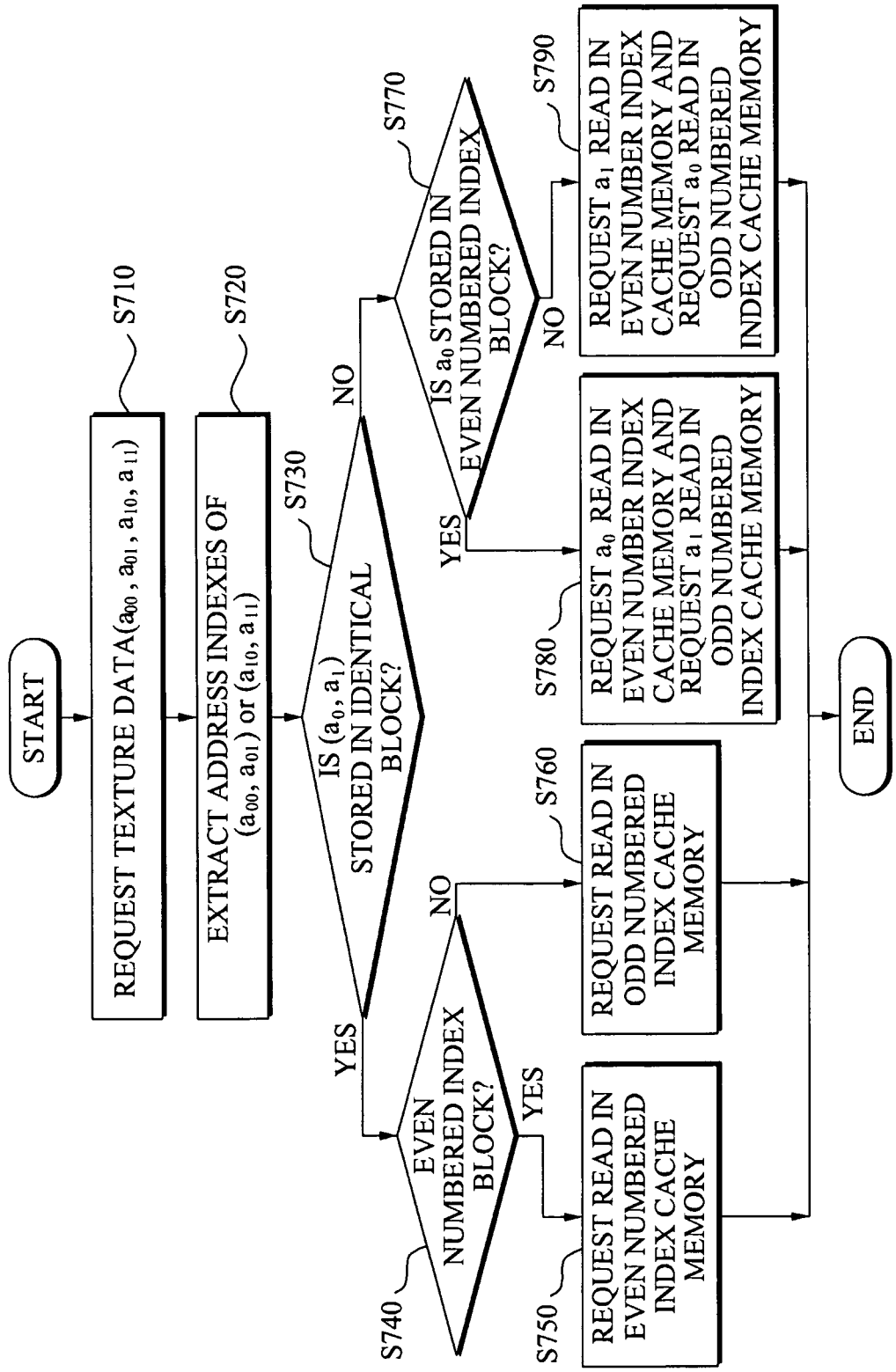
FIG. 7 is an operation flowchart illustrating a method of reading texture data for texture mapping according to example embodiments.

FIG. 7 is an operation flowchart illustrating a method of reading texture data for texture mapping according to example embodiments.

Referring to FIG. 7, in operation S710, the method of reading texture data for texture mapping according to the present embodiment may request texture data $$\begin{pmatrix} a_{00} & a_{01} \\ a_{10} & a_{11} \end{pmatrix}$$

for the texture mapping.

Here, $a_{00}$, $a_{01}$, $a_{10}$, and $a_{11}$ may represent the requested texture data, and each subscript may represent an address index of each of the requested texture data. $a_{00}$ and $a_{01}$ may be adjacent to each other in a row having an identical row index, and $a_{10}$ and $a_{11}$ may be also adjacent to each other in a row having an identical row index.

Also, in operation S720, the method of reading texture data according to the present embodiment may extract two address indexes of the requested texture data.

In this instance, the method of reading texture data may extract address indexes of at least two texture data having an identical row index. For example, the method of reading texture data may extract address indexes of $a_{00}$ and $a_{01}$ and address indexes of $a_{10}$ and $a_{11}$. Hereinafter, $a_{00}$ and $a_{10}$ may be represented as $a_0$, and $a_{01}$ and $a_{11}$ may be represented as $a_1$.

Also, in operation S730, the method of reading texture data according to the present embodiment may determine whether the extracted $a_0$ and $a_1$ are stored in an identical block based on the address indexes of the extracted $a_0$ and $a_1$.

In operation S740, when $a_0$ and $a_1$ are stored in the identical block, the method of reading texture data according to the present embodiment may determine whether the block storing $a_0$ and $a_1$ is an even numbered index block.

In operation S750, when $a_0$ and $a_1$ are stored in the even numbered index block, the method of reading texture data according to the present embodiment may perform, in the even numbered index cache memory, reading request with respect to $a_0$ and $a_1$.

In operation S760, when $a_0$ and $a_1$ are stored in an odd numbered index block, the method of reading texture data according to the present embodiment may request, in the odd numbered index cache memory, reading request with respect to $a_0$ and $a_1$.

Conversely, in operation S770, when $a_0$ and $a_1$ are not stored in an identical block, the method of reading texture data according to the present embodiment may determine whether $a_0$ is stored in the even numbered index block. Because, when $a_0$ is stored in the even number index block, $a_1$ may be stored in the odd number index block, and when $a_0$ is stored in the odd number index block, $a_1$ may be stored in the even number index block.

Also, in operation S780, when $a_0$ is stored in the even numbered index block, the method of reading texture data according to the present embodiment may perform, in the even numbered index cache memory, reading request with respect to $a_{01}$ and may perform, in the odd numbered index cache memory, reading request with respect to $a_1$. In this instance, the method of reading texture data according to the present embodiment may perform, in the even numbered index cache memory and the odd numbered index cache memory, reading requests in parallel, thereby improving a processing speed.

Conversely, in operation S790, when $a_0$ is stored in the odd number index block, the method of reading texture data according to the present embodiment may perform, in the even number index cache memory, reading request with respect to $a_1$, and may perform, in the odd numbered index cache memory, a reading request with respect to $a_0$.

The method of reading texture data for texture mapping according to the above-described example embodiments may be recorded in non-transitory computer-readable media including program instructions to implement various operations embodied by a computer. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer' using an interpreter. The described hardware devices may be configured to act as one or more software modules in order to perform the operations of the above-described example embodiments, or vice versa. The method of reading texture data for texture mapping according to the above-described example embodiments may be implemented in computing hardware (computing apparatus) and/or software, such as (in a non-limiting example) any computer that can store, retrieve, process and/or output data and/or communicate with other computers. The results produced can be displayed on a display of the computing hardware.

Further, according to an aspect of the embodiments, any combinations of the described features, functions and/or operations can be provided.

Figure 8:
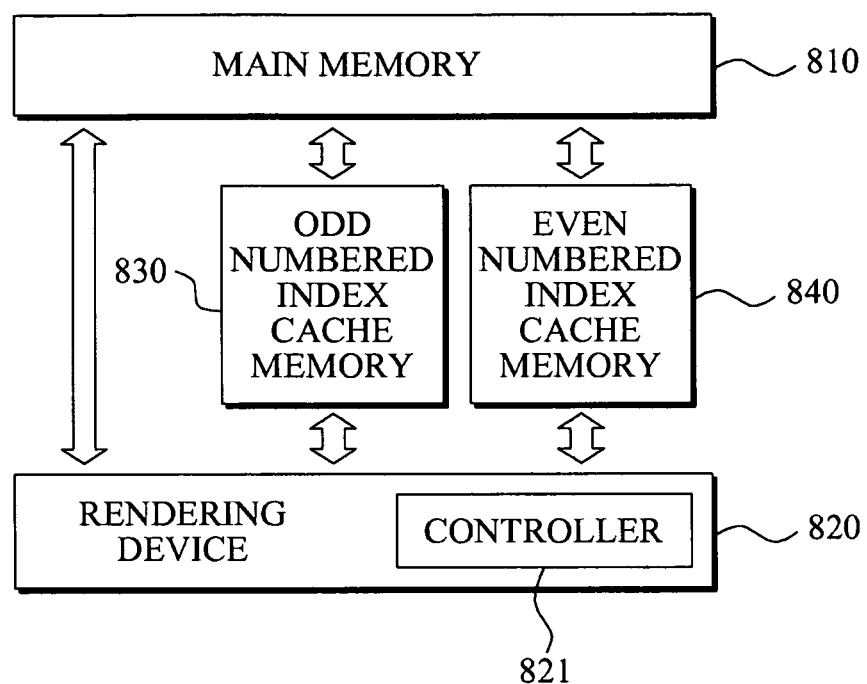
FIG. 8 is a block diagram illustrating an apparatus of reading texture data for texture mapping according to example embodiments.

FIG. 8 is a block diagram illustrating an apparatus of reading texture data for texture mapping according to example embodiments.

Referring to FIG. 8, the apparatus of reading texture data according to the present embodiment may include a main memory 810, a rendering device 820, an odd numbered index cache memory 830, and an even numbered index cache memory 840.

The main memory 810 may store a plurality of texture data constituting at least one texture image. The rendering device 820 may perform texture mapping using the plurality of texture data stored in the main memory 810.

In this instance, texture data frequently requested by the rendering device 820 may be stored in the odd numbered index cache memory 830 and even numbered index cache memory 840. In particular, the odd numbered index cache memory 830 may store texture data having index addresses corresponding to odd numbered index block, and the even numbered index cache memory 840 may store texture data having index addresses corresponding to even numbered index blocks.

A controller 821 may generate, in the odd numbered index cache memory 830 or the even numbered index cache memory 840, reading request with respect to the requested texture data based on at least two address indexes of the requested texture data.

In particular, the controller 821 may extract the at least two address indexes corresponding to at least two texture data having an identical row index from among the requested texture data, and ascertain a storage pattern of the requested texture data using the extracted at least two address indexes.

For example, the requested texture data may be stored in the odd numbered index cache memory or even numbered index cache memory, or dispersedly stored in the odd numbered index cache memory and even numbered index cache memory, whereby the controller 821 may ascertain where the requested texture data is stored using the extracted at least two address indexes.

Also, when the requested texture data is stored in the odd numbered index cache memory, the controller 821 may generate reading request with respect to the odd numbered index cache memory, and when the requested texture data is stored in the even numbered index cache memory, the controller 821 may generate the reading request with respect to the even numbered index cache memory. In addition, when the requested texture data is dispersedly stored in the even numbered index cache memory, the controller 821 may generate the reading request with respect to the odd numbered index cache memory and even number index cache memory.

In this instance, the odd numbered index cache memory 830 or the even numbered index cache memory 840 may extract the requested texture data in response to the reading request.

Descriptions of FIGS. 1 to 7 may be applicable in the apparatus of reading texture data illustrated in FIG. 8, and thus detailed descriptions of the apparatus of reading texture data will be herein omitted.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An apparatus of reading texture data for texture mapping, the apparatus comprising:
   an odd numbered index cache memory to include a plurality of odd numbered index blocks having an odd numbered index;
   an even numbered index cache memory to include a plurality of even numbered index blocks having an even numbered index; and
   a controller to generate a read request with respect to requested texture data in the odd numbered index cache memory or the even numbered index cache memory based on at least two address indexes of the requested texture data,
   wherein the texture data is stored in an odd numbered index block or an even numbered index block based on an address in a main memory where the texture data is stored, wherein the controller determines whether all of the at least two address indexes of the requested texture data correspond to the odd numbered index cache memory or to the even numbered index cache memory prior to generating the read request, and
   wherein the controller extracts the at least two address indexes corresponding to at least two texture data having an identical row index from among the requested texture data.

2. The apparatus of claim 1, wherein a number of the requested texture data is '4'.

3. The apparatus of claim 1, wherein the controller analyzes the address indexes of the requested texture data to extract the at least two address indexes from among the address indexes of the requested texture data.

4. The apparatus of claim 1, wherein each of the plurality of odd numbered index blocks and plurality of even numbered index blocks stores $2^k$ numbered-texture data, wherein k is a natural number.

5. The apparatus of claim 1, wherein the controller determines whether the requested texture data is stored in the odd numbered index cache memory or in the even numbered index cache memory, or whether the requested texture data is dispersedly stored in the odd numbered index cache memory and the even numbered index cache memory, and generates the read request based on a determined result.

6. The apparatus of claim 5, wherein the controller generates the read request with respect to the odd numbered index cache memory when the requested texture data is stored in the odd numbered index cache memory, and generates the read request with respect to the even numbered index cache memory when the requested texture data is stored in the odd numbered index cache memory.

7. The apparatus of claim 5, wherein the controller generates the read request with respect to the odd numbered index cache memory and the even numbered index cache memory when the requested texture data is dispersedly stored in the even numbered index cache memory.

8. The apparatus of claim 1, wherein the odd number index cache memory or the even numbered index cache memory outputs the requested texture data in response to the read request.

9. A method of reading texture data for texture mapping, the method comprising:
   storing texture data in each of a plurality of odd numbered index blocks included in an odd numbered cache memory, the plurality of odd numbered index blocks having an odd numbered index;
   storing texture data in each of a plurality of even numbered index blocks included in an even numbered index cache memory, the plurality of even numbered index blocks having an even numbered index;
   determining whether all of the at least two address indexes of the requested texture data correspond to the odd numbered index cache memory or to the even numbered index cache memory; and
   generating a read request with respect to requested texture data in the odd numbered index cache memory or in the even numbered index cache memory based on address indexes corresponding to the requested texture data,
   wherein the determining is done prior to the generating,
   wherein the texture data is stored in an odd numbered index block or an even numbered index block based on an address in a main memory where the texture data is stored, and
   wherein the generating includes extracting the at least two address indexes corresponding to at least two texture data having an identical row index from among the requested texture data.

10. The method of claim 9, wherein each of the plurality of odd numbered index blocks and plurality of even numbered index blocks stores $2^k$ numbered-texture data, wherein k is a natural number.

11. The method of claim 9, wherein the generating includes determining whether the requested texture data is stored in the odd numbered index cache memory or in the even numbered index cache memory, or whether the requested texture data is dispersedly stored in the odd numbered index cache memory and the even numbered index cache memory.

12. The method of claim 11, wherein the generating generates the read request with respect to the odd numbered index cache memory when the requested texture data is stored in the odd numbered index cache memory, or generates the read request with respect to the even numbered index cache memory when the requested texture data is stored in the even numbered index cache memory.

13. The method of claim 11, wherein the generating generates the read request with respect to the odd numbered index cache memory and the even numbered index cache memory when the requested texture data is dispersedly stored in the even numbered index cache memory.

14. At least one non-transitory computer-readable medium comprising computer readable instructions implementing the method of claim 9.

* * * * *